United States Patent [19]

Munz

[11] 3,788,791

[45] Jan. 29, 1974

[54] CLOSURE NOZZLE WITH A MOVABLE COVER FOR AN INJECTION MOLDING MACHINE

[75] Inventor: Paul Munz, Netstal, Switzerland

[73] Assignee: Maschinenfabrik & Giessrei Netstal A.G., Netstal, Switzerland

[22] Filed: Aug. 24, 1971

[21] Appl. No.: 174,337

[30] Foreign Application Priority Data
Aug. 27, 1970 Switzerland.................... 12872/70

[52] U.S. Cl.......... 425/245, 425/DIG. 224, 222/536
[51] Int. Cl.............................................. B29f 1/02
[58] Field of Search.... 425/245, 242; 222/556, 536, 222/537, 505, 531

[56] References Cited
UNITED STATES PATENTS

| 2,375,693 | 5/1945 | Russell et al......................... | 425/245 |
| 3,358,889 | 12/1967 | Robinson............................. | 222/531 |
| 3,026,567 | 3/1962 | Scott, Jr. et al. ................... | 425/245 |
| 2,773,284 | 12/1956 | Kelly................................... | 425/245 |
| 3,132,772 | 5/1964 | Bristow............................. | 222/505 X |
| 3,612,364 | 10/1971 | Coucher............................ | 222/537 |
| 2,533,282 | 12/1950 | Osman............................... | 425/242 X |
| 3,635,628 | 1/1972 | Cook................................. | 425/242 X |

Primary Examiner—J. Spencer Overholser
Assistant Examiner—David S. Safran
Attorney, Agent, or Firm—McGlew and Tuttle

[57] ABSTRACT

An injection molding machine includes a closure nozzle having a discharge orifice through which the material which is plasticized is directed. The orifice is closed by a cover member formed at the end of a lever which is pivotal on a slide secured to one side of the injection molding machine housing. The lever has two pivot pins one of which is confined within a slot extending obliquely in respect to the axis of the injection molding machine die orifice and the other of which is confined in an angled slot having one leg portion running in generally the same direction as the first slot and another leg portion running normal thereto. The lever is connected to means for shifting the lever, for example a fluid pressure-operated piston which is articulated to one end of the lever. The pins on the lever which are confined in the respective slots cause the lever to move from the fully opened position first in a direction at an angle to the axis of the orifice and thereafter when the closure seal portion of the lever is located beyond the end of the orifice in a direction causing it to pivot above the pivot pin nearest the orifice to shift the closure portion to a position overlying and sealing the orifice.

7 Claims, 3 Drawing Figures

INVENTOR.
PAUL MUNZ
BY
John J. McGlew
ATTORNEY

CLOSURE NOZZLE WITH A MOVABLE COVER FOR AN INJECTION MOLDING MACHINE

BACKGROUND OF THE INVENTION

1. Field of the Invention

This invention relates in general to injection molding devices and in particular to new and useful injection molding device having a nozzle with a discharge orifice which is closable by a cover which is mounted on a movable lever member.

2. Description of the Prior Art

The known closure dies are closed by devices which are at a great distance from the nozzle orifice. This is true not only of the sliding nozzles which are relatively easy to manufacture but also the nozzles having a closure slide working cross-wise to the stream of the molding material. Even with needle-closure nozzles the closure point lies at a distance behind the nozzle orifice. All these known closure nozzles therefore have the disadvantage that after the closing of the nozzle a plug of material separated from the plasticizing zone falls between the closure point and the nozzle orifice. This plug is a disturbing factor especially at the start of injection molding and it leads to defective molded parts.

SUMMARY OF THE INVENTION

In accordance with the present invention the disadvantage of the prior art are overcome by providing an injection molding machine nozzle with a closure in the form of a lever with a closure seal portion which can be pressed against the nozzle orifice from the outside to close it off. The sealing of the nozzle directly at the nozzle orifice makes it impossible for any formation to form. This is because the sealing occurs from the outside and the closure member in no way impairs the flow of material in the nozzle or the optimum formation of the nozzle bore. It is thus possible in machines with conveyor worms to bring the tip of the worm to the orifice end of the nozzle bore. The arrangement, furthermore, is such that undesireably high internal pressure in the closed nozzle overcomes the closing force acting on the closure lever so that the material can escape directly through the nozzle orifice.

Accordingly it is an object of the invention to provide a injection molding machine with a nozzle having an orifice which is closed by a sealing portion of a lever member which is mounted adjacent the nozzle housing and which is actuated by means to effect the die closing.

A further object of the invention is to provide a nozzle closure mechanism which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

GENERAL DESCRIPTION OF THE PREFERRED EMBODIMENT

Figure 1:
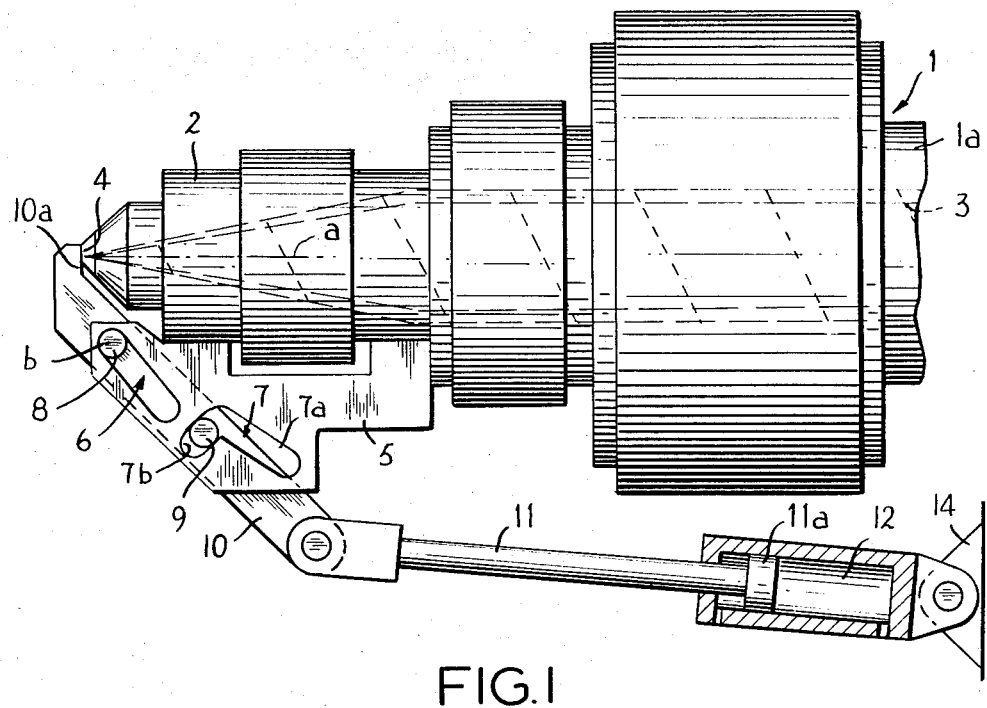
FIG. 1 is an enlarged partial side elevational and partial sectional view of an injection molding machine having a nozzle with a closure mechanism constructed in accordance with the invention.

Referring to the drawings in particular the invention embodied therein comprises an injection molding machine 1 having a heated plasticizing cylinder or housing 1a with a hollow interior in which is rotatable a worm 3. The tip of the worm 3 extends to a location directly behind a nozzle orifice 4 and when the worm 3 is rotated a favorable flow of molding material is effected.

In accordance with the invention a guide-plate or slide-plate 5 is secured to the housing 1a and is provided with two spaced slots comprising a pivot slot 6 and a movement slot 7 in which are guided transverse pins 8 and 9 respectively of a closure lever member generally designated 10.

The closure lever member 10 is provided with a closure portion or nozzle cover 10a which surrounds and provides a cover and a seal for the orifice 4 when it is in the closed position indicated in FIG. 1.

The opposite end of the closure lever 10 is articulated to a piston rod 11 which has a piston 11a which is movable in a fluid pressure cylinder such as hydraulic cylinder 12 which is articulated to the machine frame 14. The piston 11a and cylinder 12 comprise a piston and cylinder means for moving the lever 10 and also biasing means for biasing it into a nozzle closing position.

In accordance with a feature of the invention the pivot slot 6 extends obliquely to the axis $a$ of the die orifice. The movement slot 7 is an angle slot which permits first a generally axial displacement of the pin 9 of the lever member and thereafter a transverse displacement of this end of the lever member while the opposite end is pivoted by engagement of the pin 8 at the end of the slot 6.

The slot 7 includes a first slot portion 7a extending obliquely to the axis $a$ and a second slot portion 7b providing a transverse slot part which permits pivotal movement of this end of the lever member 10. The ends of the slots 6 and 7 are rounded and of the same configuration as the diameter of the cross-pins 8 and 9. The center $b$ of the end portion of the slot 6 adjacent the nozzle orifice 4 forms the center of curvature for the movement of the pin 9 in the second slot portion 7b.

In the closing position of the closure lever 10 as shown in FIG. 1 in which the seal area 10a is pressed against the nozzle orifice from the outside, the pressing force is produced by hydraulic pressure in the cylinder 12. In the closing position, the transverse pin 8 lies at the end of the slot 6 which is closest to orifice while the pin 9 lies in the transverse slot portion 7b. On opening the closure die, which is effected hydraulically by means of the piston 11a, the lever 10 is pivoted by the returning piston rod 11 in a first phase of moving about the axis of pin 8 (center $b$) counterclockwise in the drawing. This continues until pin 9 has been moved out of the slot section 7b, and as FIG. 2 indicates, the closure lever 10 then clears the nozzle orifice 4. Upon further retraction of the piston rod 11 the closure lever 10 is guided parallel in the slots 6 and 7 by means of pins 8 and 9 and is pulled back behind the nozzle orifice 4 shown in FIG. 3 so that the connection of the die orifice 4 to the mold to be filled is possible. The closing of the nozzle occurs in the reverse sequence of movement.

Instead of a planer seal area of the nozzle cover 10a, a conical or spherical sealing element may be provided at the closure part of the lever 10. An essential advantage of the described movement is that closure lever 10 clears and or closes the nozzle orifice by frontal lifting off and setting down of the seal portion on the counter surface of the nozzle orifice plate and hence a relative sliding movement or shifting movement is avoided. The packing element of the closure lever may be designed as an external slide when the relative sliding movement does not constitute a disadvantage. In this instance the closure lever is perpendicular to the nozzle axis at least during the closing or opening phase of movement. On the other hand the guidance of the closure lever 10 may be such that the lever 10 moves along a steady curve during the entire advancing and closing movement or during the opening and retracting movement.

Figures 2, 3:
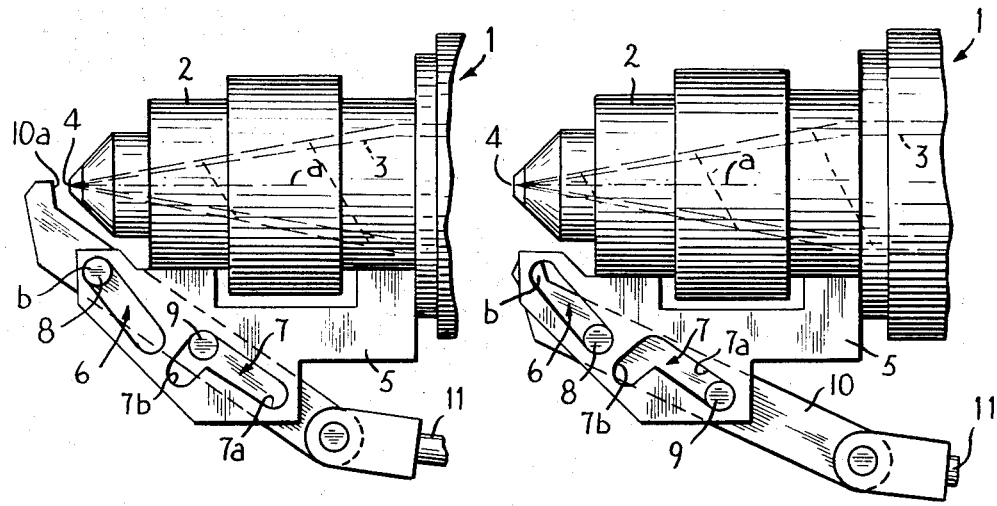
FIG. 2 is a view similar to FIG. 1 but on a reduced scale showing the closure lever in an intermediate open position.
FIG. 3 is a view similar to FIG. 2 with the closure die in a fully opened position.

The guide plate 5 with the slots 6 and 7 constitute guide means which move the lever 10 with the nozzle cover 10a from an open position, as shown in FIG. 3, with the nozzle cover to one side of, and behind the nozzle orifice 4, first to a position in which the nozzle cover 10a is in front of the nozzle orifice 4, as shown in FIG. 2. Thereafter, the nozzle cover is moved by the guide means under the force of the piston 11a axially in respect to the nozzle orifice 4 in a direction inwardly toward the orifice to close it and to seal it.

I claim:

1. In a device for injecting a plasticized material comprising a plasticized housing having a nozzle with a discharge orifice through which the material is discharged; the improvement comprising, a lever member having a portion forming a nozzle orifice cover, and means for shifting said lever member to press the cover over the nozzle to seal the orifice; a slide plate mounted alongside the exterior of said housing, said slide plate having first and second guide slots, said lever member having respective first and second pins confined in respective first and second guide slots, said first pin being closest to said nozzle and being pivotal within said first guide slot and a second pin being shiftable in an arc to permit pivoting of the lever member about said first pin, said first pin slot being generally parallel to the longitudinal axis of said lever member and a second pin slot having a forward transverse slot portion extending transverse to the longitudinal axis of said lever member and a rearward slot portion generally parallel to the longitudinal axis of said lever member, said slots being arranged to provide oblique movement of said lever member from a retracted position behind the plane of said nozzle orifice to a position extending beyond the plane and pivotal movement to close said orifice cover over the nozzle orifice when said lever is pivoted about the center of said first pin member.

2. In a device for injecting a plasticized material, comprising a plasticized housing having a nozzle with a discharge orifice through which the material is discharged; the improvement comprising, a lever member having a portion forming a nozzle orifice cover, and means for shifting said lever member to press the cover over the nozzle to seal the orifice; said cover of said lever member comprising a laterally extending portion of one end of said lever member, a slide plate adapted to be secured to said housing and having a first slot adjacent said orifice extending obliquely to the axis of said nozzle orifice and a second slot of angle formation having a portion extending obliquely to the axis of said nozzle orifice and another portion extending transversely to said first portion, said lever member having first and second pins confined in respective first and second slots and permitting axial sliding extending and retracting movement of said lever member to position said nozzle orifice cover beyond the end of the nozzle orifice in an extended position and to position said nozzle orifice cover in a retracted position at a location behind the plane of the nozzle orifice, said lever member being pivoted when in an extended position and with the first pin at the end of said first slot and about said first pin to permit the second pin to shift through said lateral portion of said second slot and to position said closure cover member in tight sealing engagement over said nozzle orifice.

3. A plastic injection molding machine comprising a plasticizing cylinder having a nozzle with a discharge orifice, means for plasticizing material and discharging it through the nozzle orifice, a lever member on the exterior of said plasticizing cylinder having a cover portion for covering and sealing the nozzle orifice from the outside of said cylinder, moving means for moving said lever member, and guide means located exteriorly of said plasticizing cylinder and located adjacent said nozzle and cooperatively engaged with sad lever member, said guide means engaging said lever and directing its motion during movement behind the plane of said nozzle orifice in an open position and in front of said nozzle orifice plane in a closing position, and being engaged with said lever member to guide it when it is moved by said moving means from an open position located to the rear of said nozzle orifice plane to a position in front of said nozzle orifice plane and then to move it toward said nozzle and its orifice to close the orifice.

4. In a device according to claim 1 including fluid pressure operated piston and cylinder means connected to said lever for moving said lever.

5. In a device according to claim 1 including biasing means for holding said closure lever in a closing position when said orifice cover is sealed against said nozzle.

6. A plastic injection molding machine, according to claim 3, wherein said moving means comprises a fluid pressure operated piston connected to said lever member to shift said lever member, said guide means comprising a plate having a plurality of guide slots, said lever member having a guide pin engaged in each guide slot.

7. A plastic injection molding machine, according to claim 3, wherein said guide means comprises a plate having a first slot nearest to said nozzle which extends obliquely toward said nozzle and a second slot having a first leg portion extending transversely and a second leg portion extending generally obliquely toward said nozzle, said lever member having a first pin in said first slot and a second pin in said second slot, said first pin being movable down to the end of said first slot when said cover portion is moved to position it in front of the nozzle and then forming a pivot center for the other of said pins in said transverse leg portion of the second slot when said movement means continues to move said lever member.

* * * * *